United States Patent [19]

Huarng

[11] Patent Number: 5,695,580

[45] Date of Patent: Dec. 9, 1997

[54] COMPOSITE MATERIAL MADE INTEGRALLY OF A FOAM MATERIAL AND A FIBER MATERIAL AND METHOD OF MAKING SAME

[76] Inventor: Hermes Huarng, No. 23, Lane 398, Yiuan-Ping Rd., Chang-Hua, Taiwan

[21] Appl. No.: 531,907

[22] Filed: Sep. 21, 1995

[51] Int. Cl.⁶ .................. A43B 13/40; B29C 44/24
[52] U.S. Cl. ................. 156/78; 156/79; 156/324; 36/44
[58] Field of Search ..................... 36/44; 156/77, 156/78, 79, 285, 308.2, 309.6, 324

[56] References Cited

U.S. PATENT DOCUMENTS

| | | | |
|---|---|---|---|
| 3,091,019 | 5/1963 | Wetterau | 156/78 |
| 3,748,217 | 7/1973 | May et al | 156/78 |
| 4,334,877 | 6/1982 | Gregorian et al. | 8/477 |
| 4,642,912 | 2/1987 | Wildman et al. | 36/44 |
| 5,401,564 | 3/1995 | Lee et al. | 36/44 |

*Primary Examiner*—Michael W. Ball
*Assistant Examiner*—Michael A. Tolin
*Attorney, Agent, or Firm*—Browdy and Neimark

[57] ABSTRACT

A method of making integrally a composite material comprises a first fiber cloth, which is impregnated with a foaming agent before being joined with a second fiber cloth. The combination of the first fiber cloth and the second fiber cloth is treated in a heating device in which the composite material is formed integrally of the first fiber cloth, the second fiber cloth and foam layers formed by the foaming agent of the first fiber cloth and some of the foaming agent that have permeated into the second fiber cloth from the first fiber cloth. The composite material is provided with an excellent air permeability and a heat insulating capability.

1 Claim, 2 Drawing Sheets

COMPOSITE MATERIAL MADE INTEGRALLY OF A FOAM MATERIAL AND A FIBER MATERIAL AND METHOD OF MAKING SAME

FIELD OF THE INVENTION

The present invention relates generally to a composite material, and more particularly to a composite material which is made integrally of a foam material and a fiber material and is provided with the quality of excellent air permeability.

BACKGROUND OF THE INVENTION

As illustrated in FIG. 1, a conventional composite fabric material 19 is made of a fiber fabric layer 11 and a foam material layer 12, which are guided respectively by two rolling wheels 13 and 14 before they are joined together by means of an adhesive. The fiber fabric layer 11 and the foam material layer 12 are caused to stick together further by the pressing forces of rollers 15, 16, 17 and 18, and the heating process.

The conventional composite fabric material 19 described above is defective in design in that its fiber fabric layer 11 and the foam material layer 12 are susceptible to becoming detached, and that the adhesive applied to hold the fiber fabric layer 11 and the foam material layer 12 together is generally impermeable to air.

SUMMARY OF THE INVENTION

It is therefore the primary objective of the present invention to provide a method of making integrally a composite material comprising two pieces of a fiber cloth and a foam material. The composite material so made is unique in that its fiber cloth layer and the foam material layer are immune from becoming detached.

It is another objective of the present invention to provide a method of making integrally a composite material comprising two pieces of a fiber cloth and a foam material. The composite material so made has the quality of an excellent air permeability and is therefore suitable for use in making a heat insulating article or shoe pad.

The foregoing objectives of the present invention are attained by a composite material which is made integrally of a foam material and at least two pieces of a fiber cloth. The first fiber cloth is impregnated with a foaming agent before being adhered with the second fiber cloth. The combination of the first fiber cloth and the second fiber cloth is subjected to the processes of pressing and heating. The first fiber cloth is provided respectively on both outer surface and underside thereof with a predetermined thickness of the foam material while the second fiber cloth is provided on the outer surface thereof with a predetermined thickness of the foam material. The first fiber cloth and the second fiber cloth are joined together securely without an adhesion interface therebetween.

DETAILED DESCRIPTION OF THE INVENTION

Figure 1:
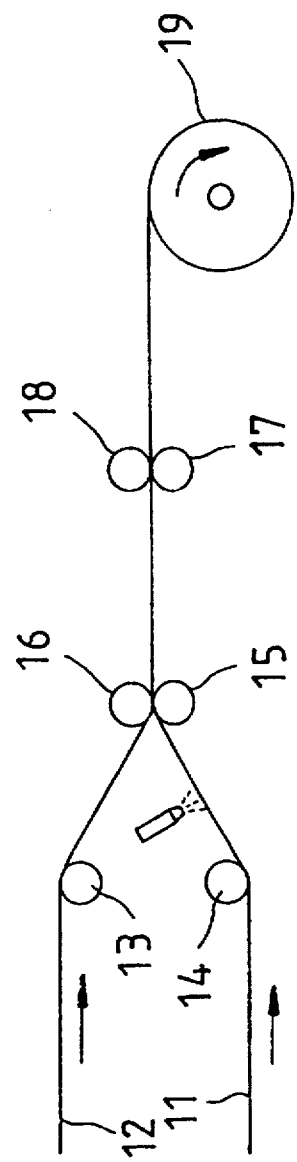
FIG. 1 shows a schematic view of a prior art method of making a composite material containing a foam material and a fiber cloth.
Figure 2:
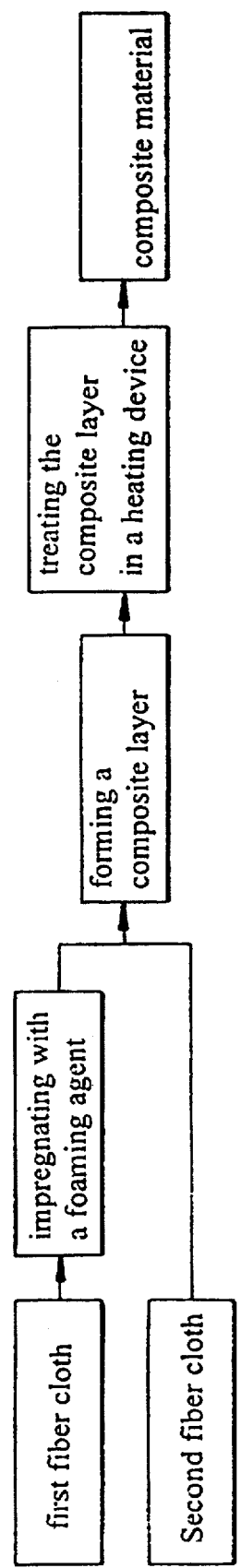
FIG. 2 shows a flow diagram of a method of making integrally a composite material containing a foam material and two pieces of a fiber cloth according to the present invention.
Figure 3:
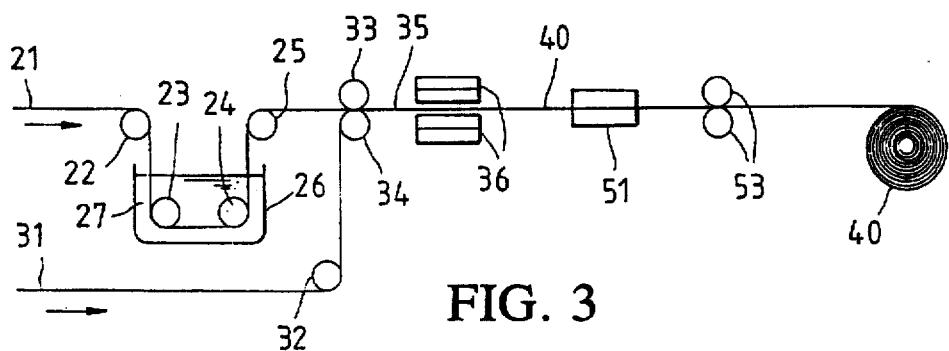
FIG. 3 shows schematic view of a process of making integrally a composite material containing a foam material and two pieces of a fiber cloth according to the present invention.

As illustrated in FIGS. 2 and 3, the method of the present invention includes the steps which are described explicitly hereinafter.

Figure 4:
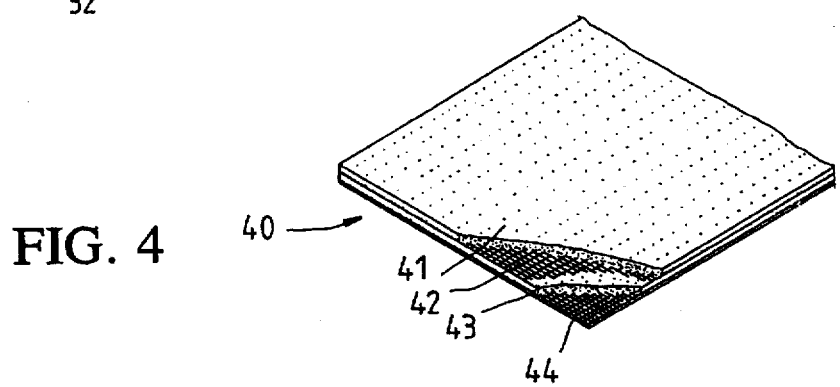
FIG. 4 shows a perspective view of a composite material made integrally by the method of the present invention.

A first fiber cloth 21, which is made of the warp and the woof by weaving and provided with the quality of excellent air permeability, is guided by four rollers 22, 23, 24 and 25 so as to move through a foaming agent tank 26 in which the first fiber cloth 21 is impregnated uniformly with a foaming agent 27. The air permeability of the first fiber cloth 21 also permitting permeability of foaming agent 27 as shown in FIG. 4 to form upper and lower foam layers 41 and 43.

A second fiber cloth 31, which is made of the warp and the woof and has an appropriate thickness, density and quality of giving an excellent sense of touch, is guided by a roller 32 to join with the first fiber cloth 21 to become a composite layer 35, which is pressed by two rollers 33 and 34.

The composite layer 35 is moved through a heating device 36 in which the foaming agent 27 of the first fiber cloth 21 is caused to foam so as to form a foam layer respectively on the upper side and the underside of the first fiber cloth 21. In addition, some of the foaming agent 27 of the first fiber cloth 21 permeates into the second fiber cloth 31. The foaming agent 27 of the second fiber cloth 31 is also caused by heat to foam so as to form a foam layer.

A composite material 40 is made integrally of the first fiber cloth 21, the second fiber cloth 31, and the foam layers. The composite material 40 is cooled in a cooling device 51 before being moved through two rollers 52 and 53.

As shown in FIG. 4, the composite material 40 is composed of an upper foam layer 41, a first fiber cloth 42, a lower foam layer 43, and a second fiber cloth 44, which are all made integrally. The composite material 40 has the quality of excellent air permeability. The upper and the lower foam layers 41 and 43 are elastic and capable of absorbing shock. Moreover, the upper and the lower foam layers 41 and 43 serve respectively as a heat insulating means. The composite material 40 is provided with an appropriate flexibility, thanks to the flexible texture of the first fiber cloth 42. In the meantime, the composite material 40 is provided with an excellent quality of the sense of touch, thanks to the fiber quality of the second fiber cloth 44. As a result, the composite material 40 of the present invention is rather suitable for use in making an insulating article, a shoe pad, and so forth.

Figure 5:
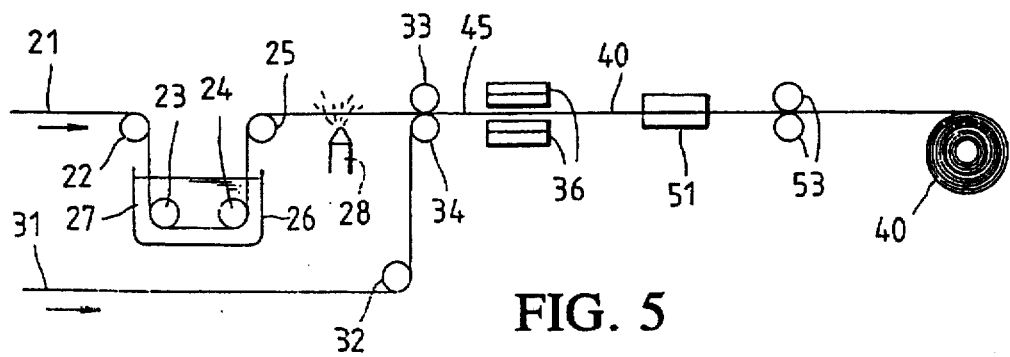
FIG. 5 shows a schematic view of a composite material making process of another embodiment of the present invention.

Another preferred embodiment of the present invention is illustrated in FIG. 5 and is generally similar to the first preferred embodiment described above, with the difference being that the former comprises a blowing nozzle 28, which is intended to blow away some of the noncondensed foaming agent 27 of the first fiber cloth 21 so as to cause the meshes of the first fiber cloth 21 to form larger breathing holes. The first fiber cloth 21 is then joined with the second fiber cloth 31 to form a composite layer 45, which is then treated in the heating device 36 to form a composite material 40 having larger breathing holes.

The embodiments of the present invention described above are to be regarded in all respects as merely illustrative and not restrictive. Accordingly, the present invention may be embodied in other specific forms without deviating from the spirit thereof. For example, the second fiber cloth 31 may be joined with the upper side of the first fiber cloth 21. In addition, the heating and the cooling devices 36 and 51 may be modified in various ways. The present invention is therefore to be limited only by the scope of the following appended claims.

What is claimed is:

1. A method of making integrally a composite material of a foam material and a fiber material comprising the steps of:

selecting and transferring a piece of a first fiber cloth made of warp and woof by weaving;

said first fiber cloth being permeable to a foaming agent;

impregnating said first fiber cloth with an appropriate amount of the foaming agent held in a containing vessel;

treating said first fiber cloth impregnated with said foaming agent with blowing means for forming larger breathing holes in, and increasing permeability of, said first fiber cloth, while blowing away some of said foaming agent from a surface of said first fiber cloth;

selecting and transferring a second fiber cloth made of warp and woof by weaving;

forming a composite layer by joining said second fiber cloth with said first fiber cloth impregnated with said foaming agent;

treating said composite layer in a heating device in which a composite material is formed of said first fiber cloth, said second fiber cloth, and two foam layers formed by said foaming agent on a first surface and a second surface of said first fiber cloth wherein a quantity of said foaming agent forming one of said two layers has permeated into said second fiber cloth from said first fiber cloth; and cooling said composite material in a cooling device.

* * * * *